United States Patent
Wada (10) Patent No.: US 8,457,407 B2
(45) Date of Patent: Jun. 4, 2013

(54) ELECTRONIC APPARATUS AND IMAGE DISPLAY METHOD

(75) Inventor: Kouetsu Wada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 12/908,805

(22) Filed: Oct. 20, 2010

(65) Prior Publication Data

US 2011/0110592 A1     May 12, 2011

(30) Foreign Application Priority Data

Nov. 11, 2009   (JP) ................................. 2009-258184

(51) Int. Cl.
*G06K 9/18* (2006.01)

(52) U.S. Cl.
USPC .................... 382/182; 715/277; 707/E17.023

(58) Field of Classification Search
USPC ....................................................... 382/182
See application file for complete search history.

(56) References Cited

U.S. PATENT DOCUMENTS

| | | | |
|---|---|---|---|
| 7,469,064 B2 | 12/2008 | Furuya et al. | |
| 2005/0033758 A1* | 2/2005 | Baxter | 707/100 |
| 2006/0103412 A1 | 5/2006 | Kimura et al. | |

FOREIGN PATENT DOCUMENTS

| | | | |
|---|---|---|---|
| JP | 2005 056390 A2 | 3/2005 |
| JP | 2006 079460 A2 | 3/2006 |
| JP | 2006 099532 A2 | 4/2006 |
| JP | 2006 236218 A2 | 9/2006 |
| JP | 2006 227291 A2 | 10/2006 |
| JP | 2009-65590 A | 3/2007 |
| JP | 2007 156782 A2 | 6/2007 |
| JP | 2007-158603 A | 6/2007 |
| JP | 2008-124554 A | 5/2008 |
| JP | 2008 131330 A2 | 6/2008 |
| JP | 2009 259120 A2 | 11/2009 |
| JP | 2009 260796 A2 | 11/2009 |

* cited by examiner

*Primary Examiner* — Stephen R Koziol
*Assistant Examiner* — Darnell Bennett
(74) *Attorney, Agent, or Firm* — Knobbe Martens Olson & Bear LLP (57) ABSTRACT

According to one embodiment, an electronic apparatus includes a text recognition module, a group creation module, a group extraction module, an arrangement module, and a movie generator. The text recognition module recognizes a character string in a plurality of still images. The group creation module creates a plurality of groups by classifying the plurality of still images. The group extraction module extracts, from the plurality of groups, groups including a still image which meets a predetermined condition. The arrangement module arranges still images included in the extracted groups in a predetermined order, and inserts a still image included in the extracted groups and including the character string at a predetermined position of the still images which are arranged. The movie generator generates movie data for successively displaying the arranged still images in the extracted groups.

8 Claims, 9 Drawing Sheets

| Image ID | Date/time of imaging | Text information (1) | | | | | Place information | Face image information | Group information |
|---|---|---|---|---|---|---|---|---|---|
| | | String | Number of characters | Size | Position | Angle | | | |
| ------ | ------ | ------ | ------ | ------ | ------ | ------ | ------ | ------ | ------ |

ELECTRONIC APPARATUS AND IMAGE DISPLAY METHOD

CROSS-REFERENCE TO RELATED APPLICATIONS

This application is based upon and claims the benefit of priority from Japanese Patent Application No. 2009-258184, filed Nov. 11, 2009; the entire contents of which are incorporated herein by reference.

FIELD

Embodiments described herein relate generally to an electronic apparatus which displays an image, and an image display method applied to the electronic apparatus.

BACKGROUND

In recent years, image reproduction apparatuses, which are called digital photo frames, have been gaining in popularity. The digital photo frame has, for example, a function of successively displaying, at regular intervals, a plurality of still images which are stored in a storage medium that is connected to the digital photo frame. In general, personal computers, digital cameras, etc., as well as the digital photo frames, have the function of successively displaying a plurality of still images at regular intervals.

Jpn. Pat. Appln. KOKAI Publication No. 2009-65590 discloses an image reproduction apparatus which plays back content in which a moving picture and a still image are mixedly present. This image reproduction apparatus successively plays back a moving picture and a slide show including a plurality of still images.

In the image reproduction apparatus of KOKAI Publication No. 2009-65590, the moving picture and the slide show including still images are played back in a time-series manner, for example, based on the date/time of capturing. In such reproduction, however, it is possible that the user has difficulty in understanding what the reproduced content is.

For example, it is assumed that the user understands the contents of photos and video, based on persons and scenes which are captured in the photos and video. However, it may be difficult, in some cases, to call to mind such definite information, as "when", "where" and "with whom", from the information obtained from the persons and scenes.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus includes a text recognition module, a group creation module, a group extraction module, an arrangement module, and a movie generator. The text recognition module recognizes a character string in a plurality of still images. The group creation module creates a plurality of groups by classifying the plurality of still images. The group extraction module extracts, from the plurality of groups, groups including a still image which meets a predetermined condition. The arrangement module arranges still images included in the extracted groups in a predetermined order, and inserts a still image included in the extracted groups and including the character string at a predetermined position of the still images which are arranged. The movie generator generates movie data for successively displaying the arranged still images in the extracted groups.

Figure 1:
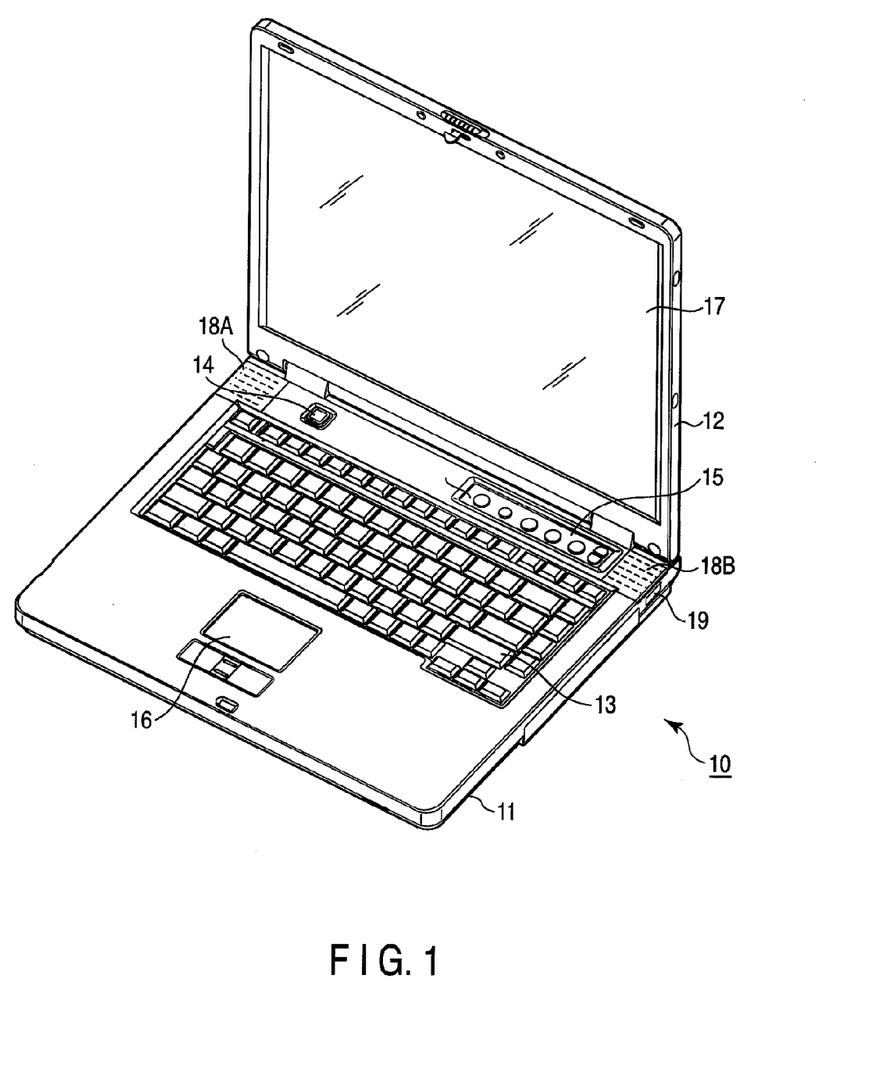
FIG. 1 shows an exemplary external appearance of an electronic apparatus according to an embodiment.

FIG. 1 is a view showing the external appearance of an electronic apparatus according to an embodiment. The electronic apparatus is realized, for example, as a notebook-type personal computer 10.

As shown in FIG. 1, the computer 10 includes a computer main body 11 and a display unit 12. A display device including a liquid crystal display (LCD) 17 is built in the display unit 12. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the universal serial bus (USB) 2.0 standard. Further, the rear surface of the computer main body 11 is provided with an external display connection terminal (not shown) which supports, e.g. the high-definition multimedia interface (HDMI) standard. This external display connection terminal is used in order to output a digital video signal to an external display.

Figure 2:
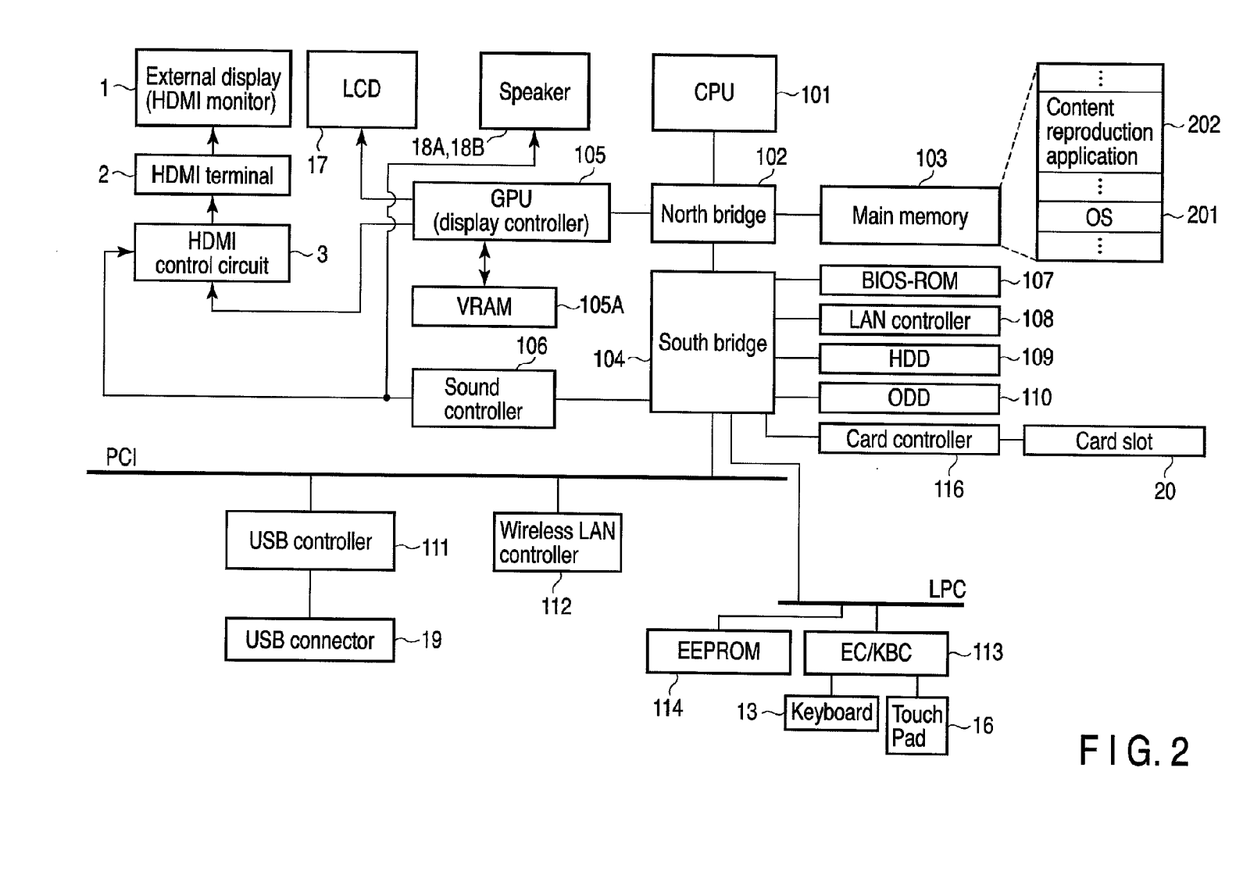
FIG. 2 shows an exemplary system configuration of the electronic apparatus according to the embodiment.

FIG. 2 shows the system configuration of the computer 10.

The computer 10, as shown in FIG. 2, includes a central processing unit (CPU) 101, a north bridge 102, a main memory 103, a south bridge 104, a graphics processing unit (GPU) 105, a video RAM (random access memory) (VRAM) 105A, a sound controller 106, a basic input/output system-read only memory (BIOS-ROM) 107, a local area network (LAN) controller 108, a hard disk drive (HDD) 109, an optical disc drive (ODD) 110, a USB controller 111, a wireless LAN controller 112, an embedded controller/keyboard controller (EC/KBC) 113, an electrically erasable programmable ROM (EEPROM) 114, and a card controller 116.

The CPU 101 is a processor for controlling the operation of the computer 10. The CPU 101 executes an operating system (OS) 201 and various application programs, such as a content reproduction application program 202, which are loaded from the HDD 109 into the main memory 103. The content reproduction application program 202 is software having a function of reproducing various digital contents, such as digital photos and home video, which are stored in, e.g. a digital versatile disc (DVD) that is set in, e.g. the ODD 110. The content reproduction application program 202 also has a function of displaying a digital image, which is stored in the HDD 109, like a so-called digital photo frame. The CPU 101 executes a BIOS in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of executing communication with the GPU 105 via, e.g. a PCI EXPRESS serial bus.

The GPU 105 is a display controller which controls the LCD 17 as a display monitor of the computer 10. A display signal, which is generated by the GPU 105, is sent to the LCD 17. In addition, the GPU 105 can send a digital video signal to an external display device 1 via an HDMI control circuit 3 and an HDMI terminal 2.

The HDMI terminal 2 is the above-described external display connection terminal. The HDMI terminal 2 is capable of sending a non-compressed digital video signal and a digital audio signal to the external display device 1, such as a TV, via a single cable. The HDMI control circuit 3 is an interface for sending a digital video signal to the external display device 1, which is called "HDMI monitor", via the HDMI terminal 2.

The south bridge 104 controls devices on a peripheral component interconnect (PCI) bus and devices on a low pin count (LPC) bus. The south bridge 104 includes an integrated drive electronics (IDE) controller for controlling the HDD 109 and ODD 110. The south bridge 104 also has a function of executing communication with the sound controller 106.

The sound controller 106 is a sound source device and outputs audio data, which is to be reproduced, to the speakers 18A and 18B or the HDMI control circuit 3.

The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard. The USB controller 111 executes communication with an external device which supports, e.g. the USB 2.0 standard (the external device is connected via the USB connector 19). For example, the USB controller 111 facilitates the transfer of digital images taken by a digital camera (connected via the USB connector 19) to the HDD 109.

The card controller 116 executes communication with a recording medium 20A which is inserted in a card slot 20. For example, the card controller 116 executes, e.g. communication at a time of reading an image file, which is stored in an SD card that is the recording medium 20A, and storing the read image file in the HDD 109.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

Figure 3:
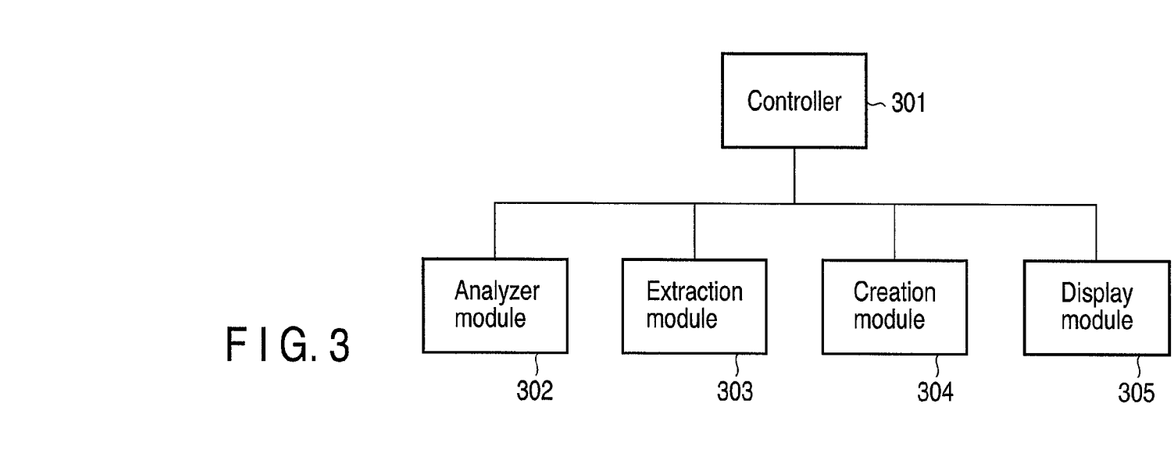
FIG. 3 is an exemplary block diagram showing the functional structure of a content reproduction application program executed by the electronic apparatus according to the embodiment.

Next, referring to FIG. 3, a description is given of a functional structure of the content reproduction application program 202 which runs on the computer 10 having the above-described structure. Of the functions of the content reproduction application program 202, a description is given of an example of the structure for realizing the function of displaying a digital image (still image data 401) in the HDD 109, like a so-called digital photo frame.

In the digital photo frame having the function of successively displaying digital images, for example, still images in the device are reproduced in the order of time of capturing or at random, and can successively be displayed on the screen. However, in such reproduction, it is possible that the user has difficulty in understanding the contents of still images which are displayed.

For example, it is assumed that the user understands the contents of photos and video, based on persons and scenes captured in the photos (video). However, it may be difficult, in some cases, to call to mind such definite information, as "when", "where" and "with whom", from the information obtained from the persons and scenes.

An example of the method for easily understanding the content of a photo is to provide text information relating to the photo. For example, the user can easily understand the location where a photo was taken, for example, from the name of the place described on a signboard appearing on the photo. In the present embodiment, a photo including text information is disposed, for example, at the top of photos that are objects of display, thereby making it possible for the user to easily understand the contents of the series of still images which are displayed.

The content reproduction application program 202 of the present embodiment includes a controller 301, an analyzer 302, an extraction module 303, a creation module 304, and a display module 305. The controller 301 controls the operations of the respective modules in the content reproduction application program 202. The analyzer 302 analyzes still images included in the still image data 401 in the HDD 109. The analyzer 302 recognizes, for example, face images and text (character string) in the still images. In addition, the analyzer 302 performs clustering of face images, measurement of the amount of text information, etc. Based on the facial information and characters recognized by the analyzer 302, the extraction module 303 extracts still images which are used in creating a slide show or photo movie. The extracted still images include still images including a large amount of text information.

The creation module 304 creates a slide show or photo movie by using the still images extracted by the extraction module 303. Based on time information and place information, the creation module 304 classifies the extracted still images into groups. The creation module 304 arranges still images included in each of the groups. For example, the creation module 304 arranges the still images included in the group based on the time information, and then places one of the still images, which includes a large amount of text information, at the top of the group. The creation module 304 creates a slide show or photo movie for successively displaying still images which have been grouped and arranged in each group. For example, when the number of still images, which have been extracted by the extraction module 303, is small, it may be possible to execute, without carrying out grouping, only a process of inserting that one of the still images, which includes a character string, at the top of the arranged still images. Besides, the creation module 304 may create a slide show by using still images which have been grouped by the analyzer 302, etc.

The display module 305 displays on the screen a slide show or photo movie, which has been created by the creation module 304. In the meantime, the creation module 304 may store the created slide show or photo movie in the HDD 109, etc., as a data file.

Figure 4:
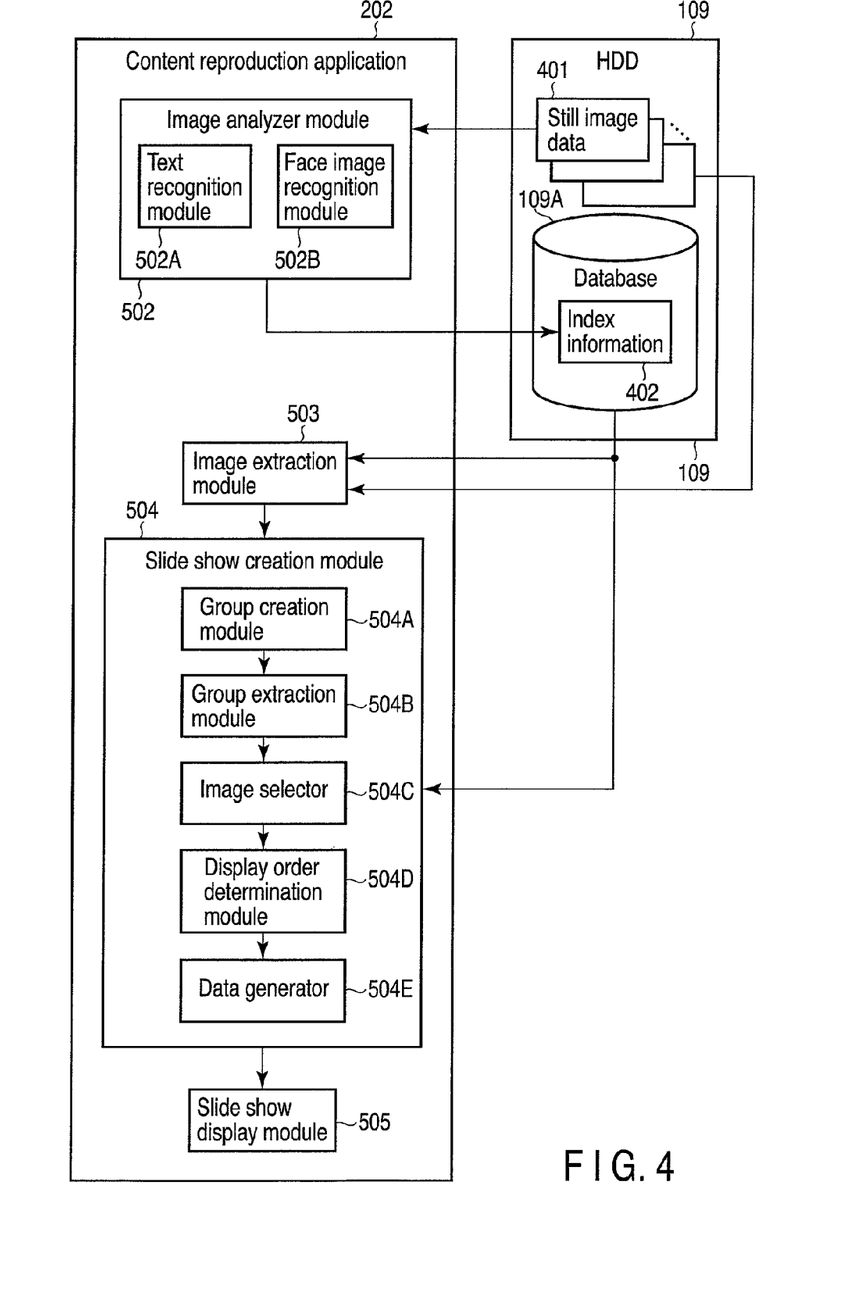
FIG. 4 is an exemplary block diagram showing an example of a detailed functional structure of the content reproduction application program of FIG. 3.

FIG. 4 shows an example of a more detailed structure of the content reproduction application program 202 shown in FIG. 3. The content reproduction application program 202 includes an image analyzer 502, an image extraction module 503, a slide show creation module 504 and a slide show display module 505.

The image analyzer 502 reads the still image data 401 in the HDD 109, and analyzes each of still images (still image data) 401. The image analyzer 502 includes a text recognition module 502A and a face image recognition module 502B.

The text recognition module 502A detects text included in each still image 401, and recognizes the detected text. The text that is recognized by the text recognition module 502A may possibly be a character string representing a word, a sentence, etc. The text recognition module 502A recognizes, for example, characters on a signboard which is captured in a still image. The text recognition module 502A detects the number of recognized characters (character string), and the size, position and angle of each character. The text recognition module 502A may determine the attribute of the character string (the place name, event name, etc.) by analyzing the content of the character string. The detection (recognition) of characters can be executed by searching for a region having a characteristic similar to the characteristic of each of characters which are prepared in advance.

The face image recognition module 502B recognizes a face image which is included in each still image 401. Specifically, the face image recognition module 502B detects, for example, a face region from the still image 401, and extracts the detected face region from the still image 401. The detection of the face image can be executed, for example, by analyzing the characteristic of the still image 401, and searching for a region having characteristics similar to face image characteristic samples which are prepared in advance. The face image characteristic samples are characteristic data which are obtained by statistically processing face image characteristics of many persons.

The face image recognition module 502B, for example, clusters the extracted face images. By the clustering, the face image recognition module 502B recognizes face images which are assumed to relate to the same person. In addition, the face image recognition module 502B may recognize a person corresponding to the extracted face image. For example, based on whether the characteristic of the extracted face image is similar to the characteristic of the face image of each of persons, the face image recognition module 502B determines whether the extracted face image is the face image of the associated person. If the characteristic is similar (e.g. the difference in characteristic is within a threshold value), the face image recognition module 502B recognizes that the extracted face image is the face image of the associated person.

The image analyzer 502 stores the information, which is obtained by the analysis, in a database 109A as index information 402. The image analyzer 502 stores in the database 109A, as index information 402, the information of text (character string) recognized by the text recognition module 502A, the information of the face image recognized by the face image recognition module 502B, the place information detected by using a GPS receiver, etc. (e.g. latitude/longitude information of a point of photography), the Exif information, and the time information based on the date/time of file creation of still image data and the date/time of update.

Figure 5:
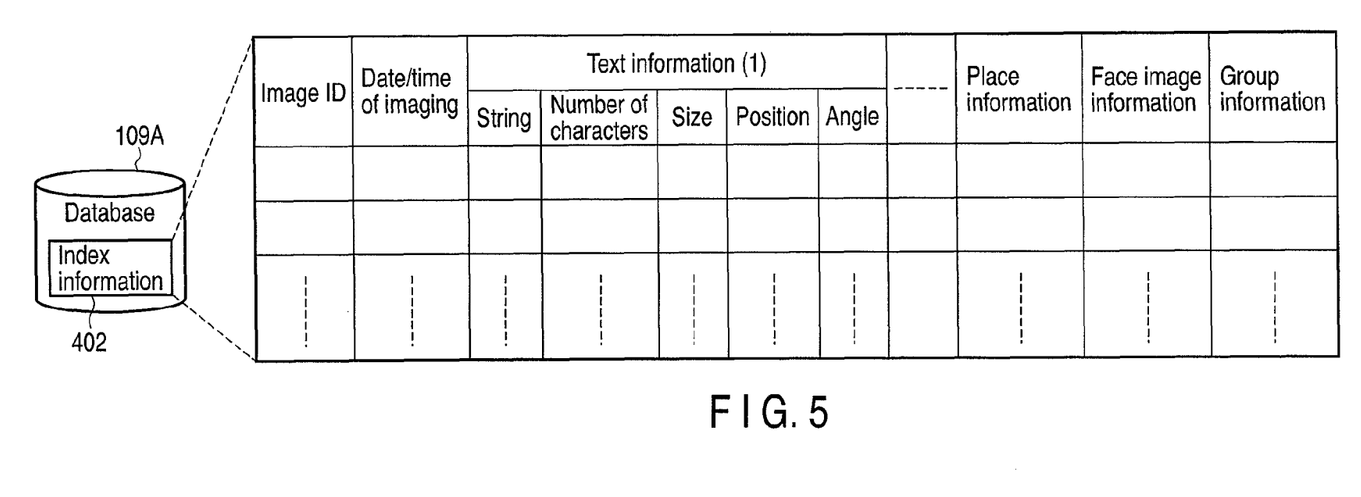
FIG. 5 shows an example of the structure of index information used by the content reproduction application program of FIG. 3.

The database 109A is a storage area which is prepared in the HDD 109 for storing the index information 402. FIG. 5 shows a structure example of the index information 402 in the database 109A.

The index information 402 includes an image ID, date/time of capturing (imaging), text information, place information, face image information, and group information. The image ID is indicative of identification information which is uniquely allocated to each of still images (still image data) 401. The date/time of capturing is indicative of time information indicating the date/time of capturing of each still image 401. When a still image is one of frames constituting moving picture data, a value (time stamp information), which is calculated by adding an elapsed time from the first frame, which is based on the frame number, to the date/time of capturing of the moving picture data, is set as the date/time of capturing of this still image.

The text information is indicative of information of a character string included in each still image 401. If each still image 401 includes a plurality of character strings, the same number of text information items, as the number of the plurality of character strings, are stored. The text information includes the character string, the number of characters, the size, the position and the angle. The character string is indicative of a character string recognized by the text recognition module 502A. The number of characters is indicative of the number of characters in the character string. The size is indicative of the size of the character string (e.g. pixel-unit image size). The position is indicative of a position at which the character string appears on the still image 401. The angle is indicative of an angle with which the character string appears on the still image 401.

The place information is indicative of the information of the place where each still image 401 was captured. The place information is indicative of, e.g. the latitude/longitude information of the place of photography, which is detected by using a GPS receiver.

The face image information is indicative of the information of the face image in each still image 401. If each still image 401 includes a plurality of face images, the same number of face image information items, as the number of the plural face images, are stored. The face image information includes the face image, frontality, size, and classification information. The face image is indicative of the face image recognized by the face image recognition module 502B. The frontality is indicative of the degree of frontality of the face image which is captured in the frontal direction. The size is indicative of the size of the face image (e.g. pixel-unit image size). The classification information is indicative of a result of classification by classifying face images, which are recognized by the face image recognition module 502B, into face images which are assumed to be the same person. Accordingly, the classification information is indicative of identification information (personal ID) which is uniquely allocated to a person.

The group information is indicative of information (group ID) for identifying groups created by a group creation module 504A. Thus, the information indicative of the group, to which the associated still image belongs, is stored as the group information.

According to the index information 402, it can be understood, with respect to each still images 401, who appears in the image, whether character strings appear in the image, and to which group the image belongs. In other words, using the index information 402, it is possible to quickly find, from the still images 401 in the HDD 109, still images 401 in which a target person appears, still images 401 in which a target person does not appear, and still images 401 in which a target person appears and also character strings appear, for instance.

The image extraction module 503 extracts, from the still images 401 in the HDD 109, still images which are used in creating a slide show (photo movie), by referring to the index information 402. The image extraction module 503 extracts, from the still images 401, still images which meet a predetermined condition, based on the time information (e.g. the information of date/time of capturing), the place information (e.g. the latitude/longitude information of the place of photography, which is detected by using a GPS receiver), and the face image information. The image extraction module 503 extracts, from the still images 401, for example, still images which were captured within a predetermined time period, that is, still images having time information within a predetermined time period. The image extraction module 503 extracts, from the still images 401, for example, still images which were captured within a predetermined region, that is, still images having place information within a predetermined region. The image extraction module 503 extracts, from the still images 401, for example, still images in which a predetermined person appears, that is, still images including the face image of a predetermined person.

In addition, referring to the index information 402, the image extraction module 503 extracts still images so that extracted still images may include a still image including a large amount of text information. For example, in the case of extracting a predetermined number of still images having time information within a predetermined time period, the image extraction module 503 preferentially extracts some still images including a large amount of text information, from the still images having time information within the predetermined time period, and then extracts other still images for the residual of the predetermined number.

With respect to each of still images meeting a predetermined condition, the image extraction module 503 calculates a text information amount (score) which is indicative of the amount of text information in the still image. The image extraction module 503 calculates the text information amount, based on the number of characters, size, position and angle of the character string in the still image. The image extraction module 503 may determine the text information amount by taking into account the attributes based on the content of the character string. The image extraction module 503 extracts a still image with a large calculated text information amount (e.g. with a text information amount of a threshold value or more) as a still image including a large amount of text information. The image extraction module 503 may extract, as still images for use in creating a slide show, all still images 401 in the HDD 109. In this case, the image extraction module 503b extracts still images with a large text information amount (i.e. still images including a large amount of text information) by classifying the still images 401.

The slide show creation module 504 creates a slide show (photo movie) by using the still images extracted by the image extraction module 503. The slide show creation module 504 includes a group creation module 504A, a group extraction module 504B, an image selector 504C, a display order determination module 504D, and a data generator 504E.

The group creation module 504A creates groups (event groups) by classifying the still images extracted by the image extraction module 503. Based on the time information, place information and face image information, the group creation module 504A classifies the still images. For example, based on the time information, the group creation module 504A classifies still images, which were captured within a predetermined time period (e.g. one day), into the same group. For example, based on the place information, the group creation module 504A classifies still images, which were captured within a predetermined region (e.g. within a designated theme park, or within a range of X meters from a designated position), into the same group. In addition, based on the face image information, the group creation module 504A classifies still images, which are assumed to show a predetermined person, into the same group. The group creation module 504A outputs the information of the created event groups to the group extraction module 504B.

The group extraction module 504B extracts event groups, which meet a predetermined condition, from the event groups created by the group creation module 504A. The user selects a person who is to be made to appear in a created slide show, or a theme of a slide show, by using, for example, the keyboard 13 or touch pad 16. The group extraction module 504B extracts event groups including still images, which relate to the selected person or theme, from the event groups created by the group creation module 504A. The group extraction module 504B outputs the information of the extracted groups to the image selector 504C.

The image selector 504C selects, for example, still images, which meet a predetermined condition, from the still images in the extracted groups. Needless to say, all the still images in the extracted groups may be selected.

The display order determination module 504D determines the display order of still images in each of the groups. The display order determination module 504D may also determine the display order between the groups. Specifically, the display order determination module 504D arranges the still images in the group in the order based on the time information, place information, etc. The display order determination module 504D then places a still image including a large amount of text information, which is chosen from among the still images in the group, for example, at the top of the group. The display order determination module 504D places, for example, a still image including the largest amount of text information at the top of the group. Specifically, the display order is determined in such a manner that a still image including a large amount of text information, that is, a still image in which the user can easily recognize the place, event, etc., is first displayed, and subsequently a photo taken at the same place or a photo taken at the same time is displayed. In the meantime, the display order determination module 504D may determine the display order of still images, other than the still image that is placed at the top of the group, based on the place information, etc., or at random. In addition, the display order determination module 504D may not always place the still image including text information at the top of the group, but may place this still image at a predetermined position, e.g. a middle position or the last position. The position where the still image including text information is placed may also be determined, based on, e.g. the theme of the slide show that is to be created, or may be designated by the user.

The data generator 504E generates data of a slide show or photo movie by using the arranged still images. In the created slide show or photo movie, not only simple successive display may be performed, but also a transition effect at a time of a change of display may be applied.

The slide show display module 505 displays on the screen (LCD 17) the slide show (photo movie) created by the slide show creation module 504. The slide show (photo movie) may be stored as a file in the HDD 109, etc.

Figure 6:
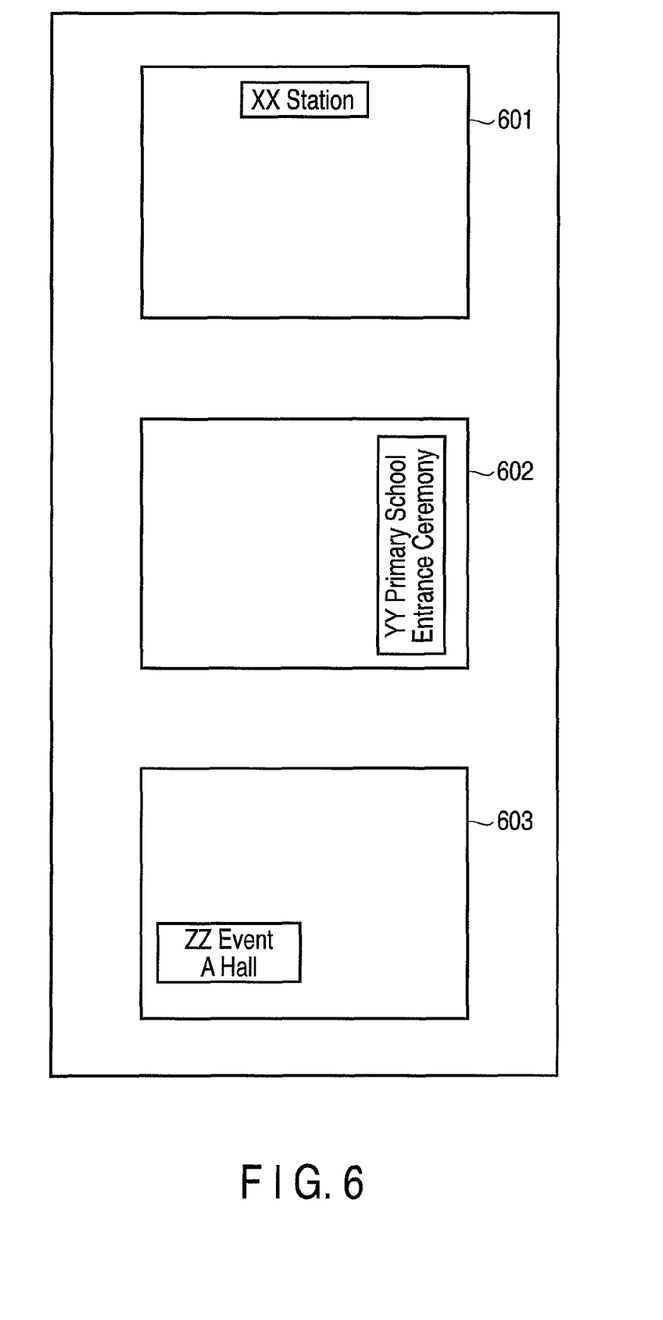
FIG. 6 shows an example of a still image including text information detected by the content reproduction application program of FIG. 3.

FIG. 6 shows an example of a still image including text information detected by the content reproduction application program 202 (text recognition module 502A). A signboard showing "XX Station" is captured in a still image 601. A notice board showing "YY Primary School, Entrance Ceremony" is captured in a still image 602. A poster showing "ZZ Event, A Hall" is captured in a still image 603. The content reproduction application program 202 recognizes characters included in the signboard, etc., and stores the recognized characters as index information 402 in the database 109A. The content reproduction application program 202 extracts, based on the index information 402, a still image including characters, and places the still image including characters, for example, at the top of still images when the still images are displayed. Since the user can recognize the place, the name of the event, etc., from the character string in the first displayed still image, the user can easily understand the contents of the series of displayed still images.

Figure 7:
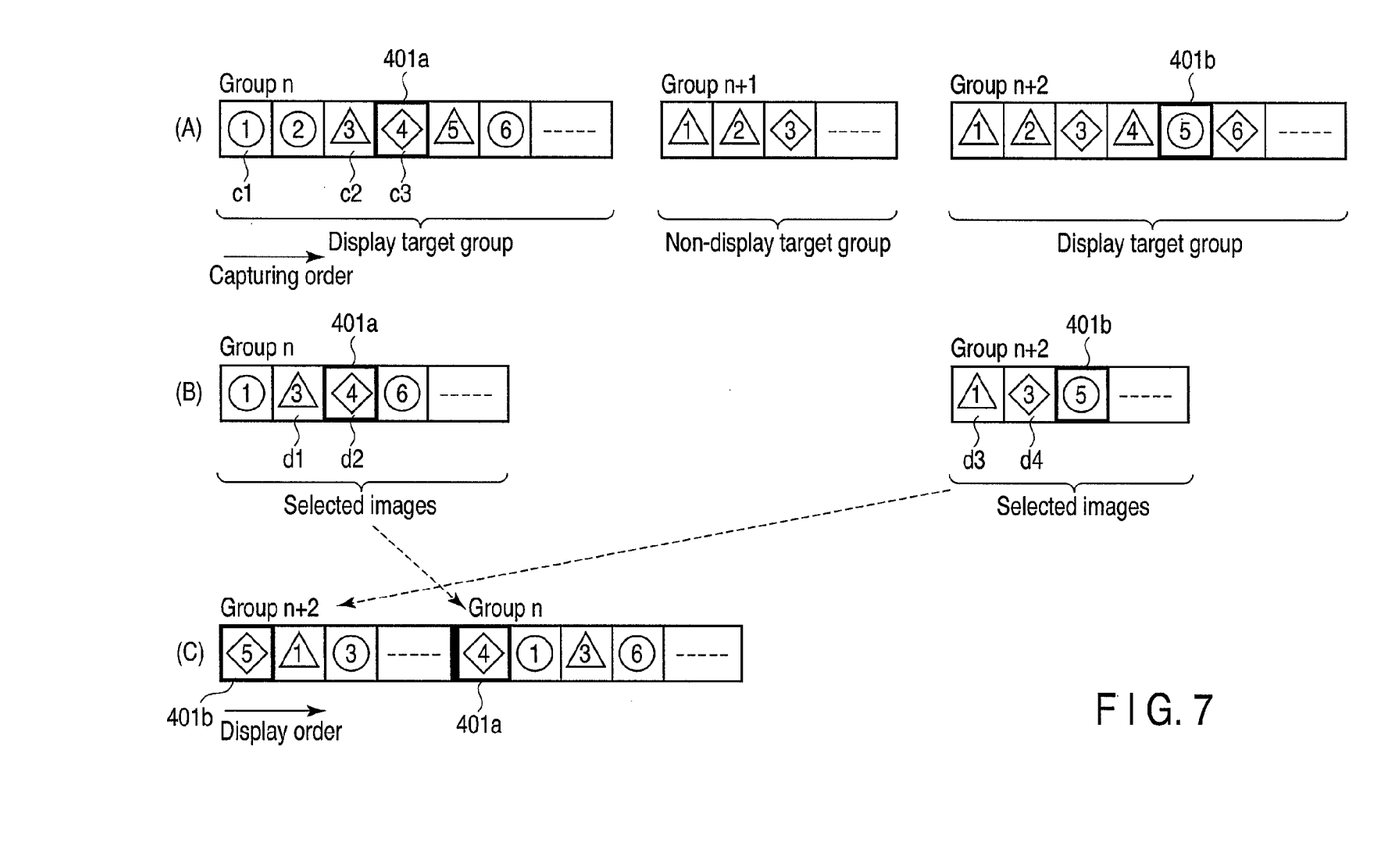
FIG. 7 is an exemplary conceptual view for explaining an example of the operation of image display, which is executed by the content reproduction application program of FIG. 3.

Referring to FIG. 7, a description is given of the extraction of groups by the group extraction module 504B, the selection of still images by the image selector 504C, and the determination of the display order of still images by the display order determination module 504D. It is assumed that a person is designated as a condition for extracting groups and selecting still images.

In FIG. 7, part (A) is a first conceptual view illustrating the state in which still images 401 stored in the HDD 109 are arranged on a time-series axis in the order of date/time of capturing (photographing), based on the index information 402 in the database 109A, and the still images 401 are classified into groups. As shown in part (A) of FIG. 7, it is assumed that the still images 401 in the HDD 109 are classified into three groups, namely, a group n, a group n+1 and a group n+2. Each of the boxes with numerals, e.g. 1, 2, 3, . . . , in each of the groups is representative of one still image 401, and these numerals are indicative of the order of dates/times of capturing in each group. Each of still images 401*a* and 401*b*, which are indicated by thick-line boxes, includes a large amount of text information.

A circle in the box of the still image 401, which is indicated by symbol c1, indicates that the still image 401 includes the face image of the designated person. A triangle in the box of the still image 401, which is indicated by symbol c2, indicates that the still image 401 is an image in which the designated person is not captured but some other person is captured. A diamond in the box of the still image 401, which is indicated by symbol c3, indicates that the still image 401 captures no person.

In short, part (A) of FIG. 7 indicates that, of the three groups, i.e. group n, group n+1 and group n+2, those groups which include the still image 401 including the face image of the designated person, are two groups, i.e. group n and group n+2. Thus, the group extraction module 504B extracts from the HDD 109 the group n and group n+2 as groups including still images that are targets of display. In the present embodiment, still images 401, which belong to the same group as the still image 401 including the face image of the designated person, are determined to be images having a relation to the designated person (even if the designated person is not captured).

Based on the index information 402 in the database 109A, the image selector 504C selects, from the still images 401A belonging to the extracted groups, still images 401, for example, the upper limit number of which is set at a predetermined number. At this time, the image selector 504C first selects the still images 401*a* and 401*b* including a large amount of text information. Then, in principle, the image selector 504C preferentially selects, for example, still images 401 including the face image of the designated person, but the image selector 504C also selects images in which no person appears, such as images of scenes.

In FIG. 7, part (B) is a second conceptual view showing a selection result of the still images 401 by the image selector 504C. As shown in part (B) of FIG. 7, in the group n, an image indicated by symbol d1, in which the designated person does not appear but some other person appears, is selected, and also an image indicated by symbol d2, in which no person appears but which includes a large amount of text information, is selected. Similarly, in the group n+2, the still image 401*b*, in which the designated person appears and which includes a large amount of text information, is selected. An image indicated by symbol d3, in which the designated person does not appear but some other person appears, and an image indicated by symbol d4, in which no person appears are also selected.

The images indicated by symbols d1 to d4 are images which could not be selected when a person is designated as search key information in conventional image search methods. In this respect, the content reproduction application program 202 executes an effective image search with a high-level intelligence, thereby to display a slide show so that "to where and with whom" can be understood.

In FIG. 7, part (C) is a third conceptual view showing the order of display of still images 401 by the display order determination module 504D. As shown in part (C) of FIG. 7, the display order determination module 504D places the still images 401*a* and 401*b* each including a large amount of text information at the top positions of the group n and group n+2, so that the contents of the displayed still images (photos) can easily understandably be presented to the user. The display order determination module 504D constructs the arrangement of groups in a time sequence from the present to the past (group n+2→group n). The display order determination module 504D then constructs the arrangement of images in each group such that the images can be enjoyed more naturally (e.g. in the order of date/time of capturing or in the order of places of capturing). In short, different algorithms may be adopted for the arrangement of groups and for the arrangement of images in each group.

If a plurality of still images each including a large amount of text information are included in the group, the image selector 504C may select the still image including the largest amount of text information, based on the above-described amount of text information. In addition, if a plurality of still images each including the amount of text information of a threshold value or more are selected by the image selector 504C, the display order determination module 504D may preferentially place the still image having the largest amount of text information at the top of the group.

In other words, the content reproduction application program 202 executes effective image display with a high-level intelligence, for example, in such a manner as to place an image, which is suitable for grasping a scene, that is, a still image with a large amount of text information, as a representative image at the first position.

Figure 8:
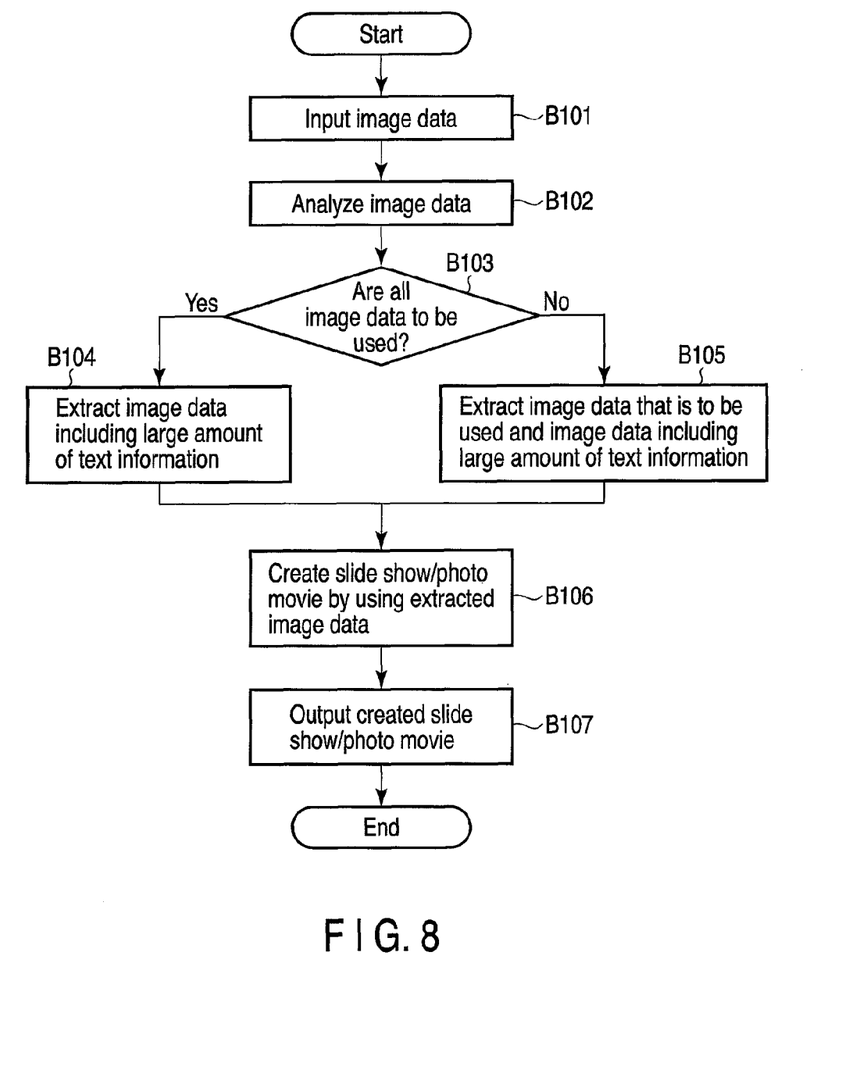
FIG. 8 is an exemplary flowchart illustrating the procedure of an image display process executed by the content reproduction application program of FIG. 3.

Next, referring to the flowchart of FIG. 8, a description is given of the procedure of the image display process executed by the content reproduction application 202.

To start with, the content reproduction application 202 reads still images (still image data) 401 from the HDD 109

(block B101). The content reproduction application 202 may read still images 401 from, for example, a recording medium inserted in the card slot 20. Then, the content reproduction application 202 analyzes the read still images 401 (block B102). The content reproduction application 202 recognizes, for example, a face image, characters, etc. included in each of the still images 401. The content reproduction application 202 stores the information of the recognized face image, characters, etc., as index information 402 in the database 109A.

The content reproduction application 202 then determines whether all still images 401 are to be used or not, in creating a slide show or photo movie (block B103). If all still images are used (YES in block B103), the content reproduction application 202 extracts, from the still images 401, still images including a large amount of text information. On the other hand, if all still images 401 are not used (NO in block B103), the content reproduction application 202 extracts, from the still images 401, still images which is to be used and still images including a large amount of text information. For example, the content reproduction application 202 extracts still images with a large text information amount from the still images 401 by calculating the text information amount indicative of the amount of text information included in each still image. The text information amount is calculated, based on the number of characters of a character string in each still image, and the size, position and angle of the character string which is rendered. A larger value is set for the text information amount, for example, as the number of characters of the character string is larger, the size of the character string is greater, the position of the character string is closer to the center, or the character string is rendered on the still image at an angle with higher legibility.

Next, the content reproduction application 202 creates a slide show or photo movie by using the extracted still images (block B106). The content reproduction application 202 classifies the extracted still images into groups. The content reproduction application 202 determines the display order of still images in each group, and the display order between the groups. The content reproduction application 202 places the still image including a large amount of text information, for example, at the top of the group. The procedure of the slide show creation process for creating the slide show (photo movie) will be described later with reference to FIG. 9.

The content reproduction application 202 outputs the created slide show or photo movie to the screen (LCD 17) (block B107). In the meantime, the content reproduction application 202 may generate a data file including the created slide show or photo movie, and store the data file in the HDD 109, etc.

Figure 9:
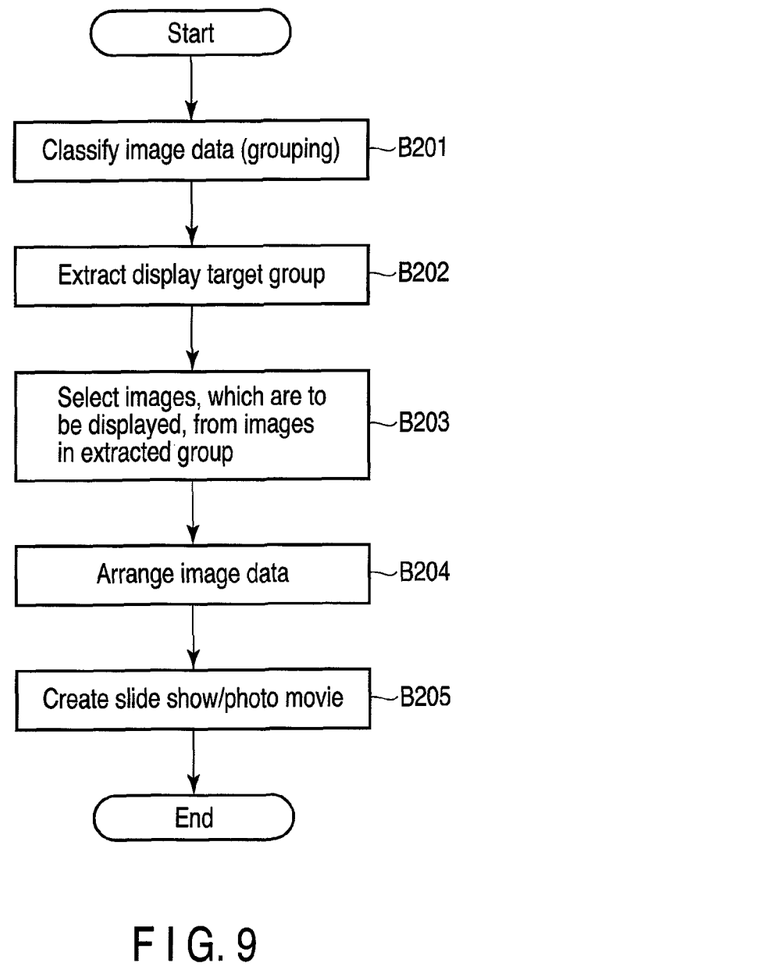
FIG. 9 is an exemplary flowchart illustrating the procedure of a slide show creation process executed by the content reproduction application program of FIG. 3.

FIG. 9 is the flowchart illustrating the procedure of the slide show creation process corresponding to block B106 in FIG. 8.

To start with, the content reproduction application 202 creates groups by classifying the still images (block B201). Based on the time information, place information and face image information, the content reproduction application 202 classifies the still images. For example, based on the time information, the content reproduction application 202 classifies still images, which were captured within a predetermined time period, into the same group. For example, based on the place information detected with use of, e.g. a GPS receiver, the content reproduction application 202 classifies still images, which were captured within a predetermined region, into the same group. In addition, for example, based on the face image information, the content reproduction application 202 classifies still images, which are assumed to show a predetermined person, into the same group.

Next, the content reproduction application 202 extracts, from the created groups, groups (display target groups) used in creating the slide show (block B202). The content reproduction application 202 extracts, for example, groups including a still image which meets a designated condition. Then, the content reproduction application 202 selects images, which are to be displayed, from the still images in the extracted groups (block B203). The content reproduction application 202 selects, in addition to the still images which meet the designated condition, still images relating thereto, for example. Thus, for example, if a person is designated as the condition for extracting groups in block B202 and for selecting still images in block B203, the content reproduction application 202 extracts groups including still images including the designated person. From the still images in the extracted groups, the content reproduction application 202 selects, in addition to the still image which shows the designated person, a still image showing some other person and a still image of a scene in which no person appears.

The content reproduction application 202 arranges the still images included in each of the extracted groups (block B204). The content reproduction application 202 determines the display order of still images in each of the extracted groups, and the display order between the extracted groups. The content reproduction application 202 arranges the still images in the group in the order based on the time information, place information, etc. The content reproduction application 202 places a still image including a large amount of text information, for example, at the top of the group. Specifically, the display order is determined in such a manner that a still image including a large amount of text information, that is, a still image in which the user can easily recognize the place, event, etc., is first displayed, and subsequently a photo taken at the same place or a photo taken at the same time is displayed.

Subsequently, the content reproduction application 202 creates a slide show or photo movie by using the arranged still images (block B205). In the created slide show or photo movie, not only simple successive display may be performed, but also a transition effect at a time of a change of display may be applied.

By the above-described process, the content reproduction application 202 can display on the screen a slide show in which still images included in each of groups are arranged in a predetermined order, and a still image including a large amount of text information is placed at the top of each group. Since the user can recognize the place, the event name, etc. relating to the still images in the group, based on the still image including a large amount of text information, the user can easily understand the contents of the photos that are displayed. In the meantime, the still image including a large amount of text information may not always be placed at the top of the group, and may be placed at a predetermined position, e.g. a middle position or the last position.

As has been described above, according to the present embodiment, the contents of photos and video which are displayed can easily understandably be presented to the user. In the embodiment, when a slide show or photo movie is created, still images are grouped, based on the place information or time information, and the still image including a large amount of text information is displayed at the beginning of each group. Thus, for example, a photo, in which the user can easily recognize the place, event, etc., is first displayed, and subsequently a photo taken at the same place or a photo taken at the same time is displayed. Thereby, since the user can first recognize the place, event name, etc., which relate to the still images included in each group, the user can easily understand the contents of photos that are displayed.

All the procedures of the image display process according to the present embodiment may be executed by software. Thus, the same advantageous effects as with the present embodiment can easily be obtained simply by installing a program, which executes the procedures of the image display process, into an ordinary computer through a computer-readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a text recognition module configured to recognize character strings in a plurality of still images;
    a face recognition module configured to recognize face images in the plurality of still images;
    a group creation module configured to create a plurality of groups by classifying the plurality of still images;
    a group extraction module configured to extract groups from the plurality of groups, the extracted groups comprising still images which comprise a face image of a specified person;
    an arrangement module configured to arrange the extracted groups in a predetermined order, to select a first still image, comprising a character string, from still images in the extracted groups with respect to each of the arranged groups, and to arrange the selected first still image at a top position of the still images in the arranged groups with respect to each of the arranged groups; and
    a movie generator configured to generate movie data for successively displaying the still images in the arranged groups,
    wherein each module and the movie generator are executed by one or more processors.

2. The electronic apparatus of claim 1, further comprising an image selector configured to select still images from the still images in the extracted groups with respect to each of the extracted groups, the selected images comprising a still image which comprises a character string,
    wherein the image selector is executed by one or more processors and the arrangement module is configured to arrange, in units of groups, the selected still images in a predetermined order, to select a second still image, comprising the character string, from the selected still images with respect to each of the extracted groups, and to arrange the selected second still image at a top position of the selected still images with respect to each of the extracted groups.

3. The electronic apparatus of claim 1, wherein the text recognition module is configured to calculate a text information amount with respect to each of the still images, the calculated text information amount indicating an information amount of a character string in the still image, and
    the arrangement module is configured to select a second still image with a maximum text information amount from the still images in the extracted groups with respect to each of the extracted groups, and to arrange the selected second still image with maximum text information amount at a top position of the still images in the extracted groups with respect to each of the extracted groups.

4. The electronic apparatus of claim 3, wherein the text recognition module is configured to calculate the text information amount with respect to each of the still images, based on a number of characters belonging to a character string in the still image, and a size, a position and an angle with which the character string is rendered.

5. The electronic apparatus of claim 1, wherein the group creation module is configured to create the plurality of groups by classifying the plurality of still images, based on place information or time information which is added to each of the still images to indicate where and when the still images were recorded.

6. The electronic apparatus of claim 1, wherein the predetermined order is an order based on place information or time information which is added to each of the still images to indicate where and when the still images were recorded.

7. The electronic apparatus of claim 1, further comprising a display module configured to display a movie on a screen, based on the movie data.

8. An image display method comprising:
    recognizing character strings in a plurality of still images;
    recognizing face images in the plurality of still images;
    creating a plurality of groups by classifying the plurality of still images;
    extracting groups from the plurality of groups, the extracted groups comprising still images which comprise a face image of a specified person;
    arranging the extracted groups in a predetermined order, selecting a still image, comprising a character string, from still images in the extracted groups with respect to each of the arranged groups, and arranging the selected still image at a top position of the still images in the arranged groups with respect to each of the arranged groups; and
    generating movie data for successively displaying the still images in the arranged groups.

* * * * *